United States Patent [19]

Wright

[11] Patent Number: 4,614,281

[45] Date of Patent: Sep. 30, 1986

[54] CLOSURE AND METHOD FOR REPAIR OF A PRESSURIZED CONTAINER

[76] Inventor: James C. Wright, 1055 N. Miller, Mesa, Ariz. 85203

[21] Appl. No.: 801,464

[22] Filed: Nov. 25, 1985

[51] Int. Cl.[4] ............................................ B65D 53/00
[52] U.S. Cl. .................................... 220/239; 220/323
[58] Field of Search ............... 220/239, 323, 240, 315; 138/97

[56] References Cited

U.S. PATENT DOCUMENTS 2,114,381  4/1938  Horner ................................ 220/239
4,058,234  11/1977  Vrolyk et al. ....................... 220/239

Primary Examiner—George T. Hall
Attorney, Agent, or Firm—Harry M. Weiss & Associates

[57] ABSTRACT

Apparatus for temporary containment of chemicals escaping from end members of a cylindrical container storing pressurized chemicals includes a plate, that can fit within the constricted walls of the ends of the cylinder and an inflatable tube around the edge of the plate. The tube, when inflated, will support the plate against the edges of the cylinder and contain the gas between the containment apparatus and the end members of the container. The repair device further includes a locking mechanism for positioning the plate with respect to threads of the cylinder and for preventing release of the plate in the event of deflation of the tube. A ($CO_2$) pressurized gas capsule can be included to provide the pressure to expand the tubing. The plate can further include a valve for eventual release of the contained chemical at a convenient location.

17 Claims, 5 Drawing Figures

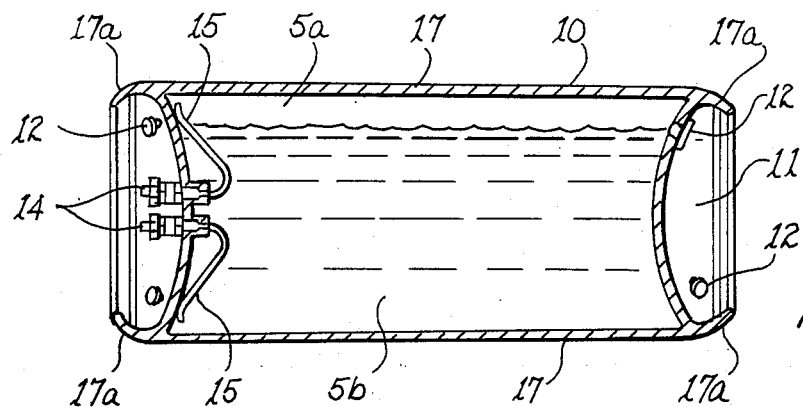
fig. 1
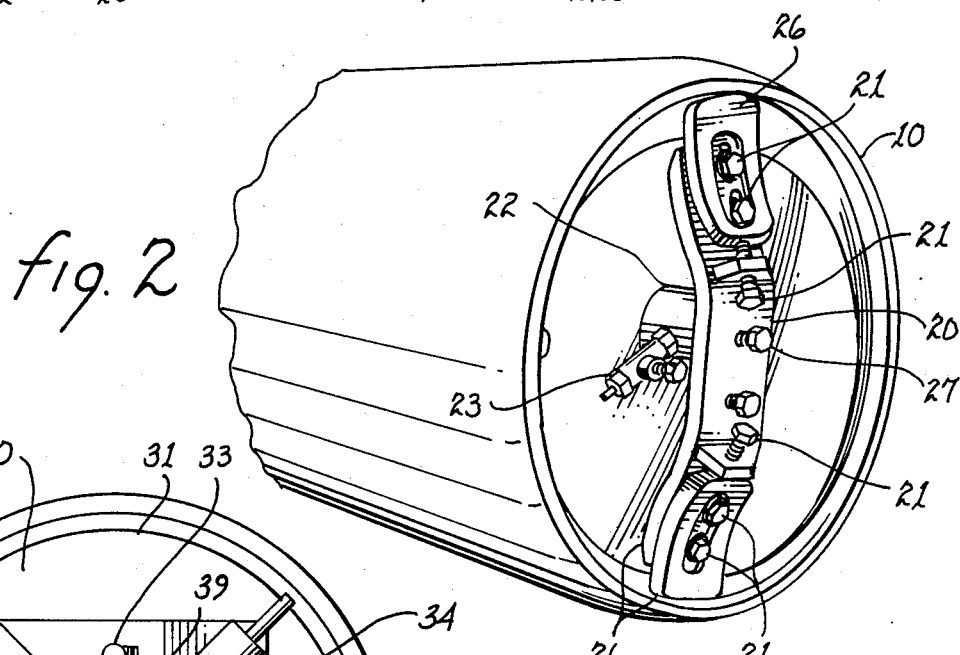
fig. 2
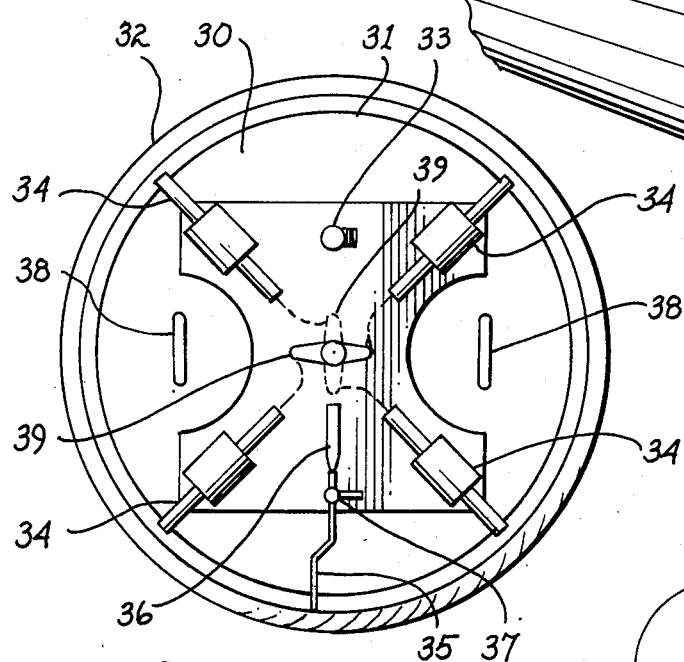
fig. 3a
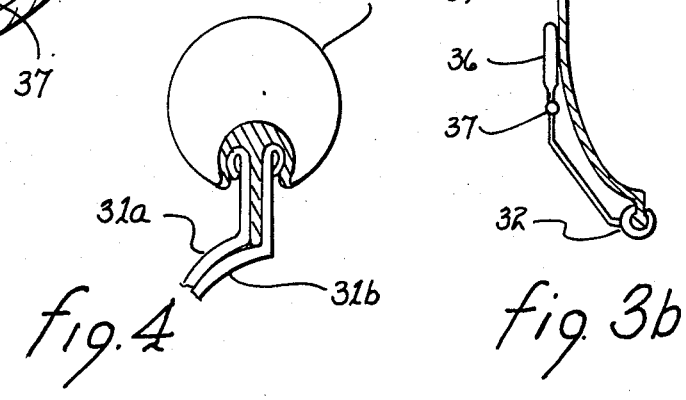
fig. 4
fig. 3b

CLOSURE AND METHOD FOR REPAIR OF A PRESSURIZED CONTAINER

BACKGROUND OF THE INVENTION

1. Field of the Invention

This invention relates generally to the containers used in the transport of chemicals and, more particularly, to the temporary repair of damaged cylinders used in the transport or storage of pressurized chemicals.

2. Discussion of the Related Art

Gases, such as chlorine, carbon dioxide and ammonia are generally supplied in a liquid state, confined under pressure in containers of a plurality of sizes. In particular, the ton container is popular for storage and transport of pressurized chemicals and has a configuration shown in FIG. 1. The ton container 10 is generally cylindrical shape, having cylindrical walls 17. At either end of the ton container 10 is an end member 11, that is recessed with respect to the ends of the cylinder walls and coupled to the cylindrical walls. In addition, the ends of the cylindrical walls, 17a, extend beyond the union with the end members 11 and are tapered. A plurality of fusible metal plugs 12 are typically inserted in the end member 11 for the purpose of preventing an explosion of the container by melting and thereby permitting the release of gas in the event of excessive heating of the cylinder. The cylindrical ton containers are typically stored in a horizontal position and typically have two valves 14 coupled to eduction pipes 15. In practice, the valves are stored in a vertical line so that the upper valve can release a gas phase of the stored chemical, 5A, while the lower valve will release liquid phase of the stored chemical, 5B. Although the integrity of the cylindrical members is seldom imperiled, there are occasions when leaks develop around the valves and/or the plugs. Therefore, it has been necessary in the past to provide apparatus for control of any leak which may occur in the end members of the cylinder.

Referring to FIG. 2, a mechanism 20 for controlling the leaks in the end of the cylinder 10 is shown. The mechanism 20 has a plurality of members 26 that are held in their relative positions by screws 21. The mechanism 20 can be expanded or contracted. These members 26 permit the apparatus to engage the constricted portion of the cylinder walls 17A and to be held in place resisting the force created by the leaking gas. A hood 22 can be used to cover the valves 14 and the surrounding area. A vent 23 is provided in hood 22 to permit the release of gas under controlled conditions. A screw 27 is used to apply pressure to the hood 22 and to force the hood against the end members 11 sufficient pressure to prevent escape of gas from the lower edges of the hood 22. Other mechanisms can be used to engage the fusible plugs and to prevent chemicals leaking from the vicinity of the plug from escaping to the surrounding environment. These mechanisms are generally satisfactory only for containing chemicals escaping in the vicinity of the fusible plugs and/or the values of the ton container. In practice, as will be seen by perusal of FIG. 2, considerable amount of time and effort are required to engage the repair mechanism 20 with the cylinder walls and to position the appropriate screws with respect to the valves to contain escaping chemicals. Despite protective clothing, it is desirable that this operation be performed as rapidly as posible and should require as little skill as possible. In addition, a multiplicity of repair devices are now required depending if the leak is from the vicinity of a valve or from a fusible plug.

A need has therefore been felt for a method and for an apparatus capable of temporary repair of the end members of ton cylinders that would be convenient to couple to the ton cylinder with requirement of training and that would contain, on a temporary basis, chemicals leaking from either the vicinity of fusible plugs or from the vicinity of the chemical valves or any other portion of the ton container or member.

SUMMARY OF THE INVENTION

It is therefore an object to provide an improved repair apparatus and method for containers storing pressurized chemical elements.

It is another object of the present invention to provide an apparatus and method for temporary repair of leaks in the end members of storage cylinders that can be coupled rapidly and without extensive training in the use of the apparatus.

It is yet another object of the present invention to provide a temporary repair apparatus and method that can be used with cylinders storing pressurized chemicals to prevent chemicals leaking from the vicinity of the valves and/or the pressure plugs.

The aforementioned and other objects are accomplished, according to the present invention, by a plate with a diameter slightly smaller than the narrowest diameter of the constricted cylinder walls of the pressurized container that can be positioned inside the constricted region. A symmetric rubber tube is coupled along the edge of the plate and the plate has a mechanism coupled therefor for inflating the tube so that, when inflated, the combination of the tube and plate has diameter larger than the diameter of the constricted cylinder walls. The pressure of the escaping chemical can seat the plate and inflated tube securely against the constricted cylinder walls. Ratchet type locks on the plate can be expanded when the plate is positioned on the interior of the constricted portion of the container to position the plate and to prevent release of the plate in case of compromise of the tube. A valve is also present to contain the release of the gas escaping from the container and to permit controlled release.

These and other features of the present invention will be understood upon reading of the following description along with the drawings.

BRIEF DESCRIPTION OF THE DRAWINGS

FIG. 1 is a cross-section view of a typical ton container of the type used to hold chemicals stored under pressure.

FIG. 2 is a perspective view of a device in current use for temporary containment of chemicals leaking from the vicinity of a valve in a pressurized chemical storage container.

FIG. 3A is a top view of repair apparatus according to the present invention for temporary containment of chemicals escaping from an end member of a pressurized container.

FIG. 3B is a cross-sectional view of the repair apparatus according to the present invention for temporary containment of chemicals escaping from an end member of a pressurized container.

FIG. 4 is a large cross-sectional view of a portion of the repair apparatus according to the present invention showing the placement of the tube around the edge of the plate.

DESCRIPTION OF THE PREFERRED EMBODIMENT

Detailed Description of the Figures

FIG. 1 and FIG. 2 have been decribed in the discussion of the related art and are, respectively, a ton cylinder with which the present invention can be used and a type of device used at the present time for temporary containment of a chemical escaping from a pressurized cylinder in the vicinity of the valve.

Referring to FIG. 3A, the repair apparatus 30 of the present invention includes a plate 31. The plate 31 generally has a diameter narrower than the constricted portion of the cylinder walls extending beyond the end members of the container. Coupled to plate 31 in the vicinity of the outer edge is a tube 32. When the tube 32 is not inflated, then the apparatus can fit inside of the constricted walls of the end of the container and can be positioned near the end members of the container. A pipe 35 is coupled to the tube 32 and has also a valve 37 coupled thereto for control the flow of gas into the tube. A $CO_2$ cartridge 36 is available to pressurize the tubing when required. Valve 37 can also include an indicator to provide visual verification that pressure is available for inflation of the tube 32. Locking mechanism 34 is available both to position the tube in the cylinder and, in case of catastrophic failure of the tubing 32, to prevent a blowout of the plate 31. A valve 33 provides a method for eventual release of gas that has escaped from the cylinder end member and has been contained between repair device 30 and the cylinder end walls. Shown by dotted lines is a coupling mechanism between a handle 39 and the locking mechanism 34. The nut can be manipulated by an operator, simultaneously expanding all of the locking mechanism in a symmetrical pattern. Handles 38 are provided for convenient operator manipulation of the repair device 30.

Referring next to FIG. 3B, a cross-sectional view of the temporary repair apparatus of the present invention is shown. The ($CO_2$) cartridge 36, the valve 37 and the coupling tube 35 all for providing an inflating gas to tube 32 are shown coupled to plate 31. Plate 31 is rounded in an outward direction for structural strength and to accommodate the pressure plug and valves extending outward from the end members of the container. The valve 33 provides a mechanism for release of chemicals temporarily contained between the apparatus 30 and the end members 11. Handle 39 can be coupled to locking mechanism 34 for engaging the plate to the cylindrical walls.

Referring next to FIG. 4, an engagement of the tube 32 to the plate 31 is shown. Plate 31 can actually consist of two sections, a plate 31a and a plate 31b, and an extended portion of the tubing 32 can be contained between these two plates. A mechanism 39 can include a mechanism such as a wing nut for securing the two portions of the plate.

Operation of the Preferred Embodiment

When the rubber tubing 32 is not inflated, then the plate 31 and the tubing 32 of the repair device 30 can be inserted into the interior of the constricted cylindrical container walls 17a in the vicinity of container end members 11. Once inserted in the vicinity of container end members, the locking mechanisms 34 can be expanded both to position the plate 31 and to provide additional support against a possible destruction of the tubing 32. The tubing 32 can then be inflated providing a seal against escaping gas. The locking mechanism 34 supports the plate against the outward pressure resulting from the escaping gas on the plate by contact with the interior sides of the curved container walls. The locking mechanism 34 can be a simple ratchet-type mechamism or, as shown by the dotted lines in Figure 3A, can be a mechanism that is extended simultaneously in all directions. Once in position, the valve 37 can be activated, permitting the ($CO_2$) cartridge to inflate the tubing 32. According to one embodiment, the plate 31 consisting of the body of device 30 can have two sections, 31a and 31b, that can be easily separated, permitting the rubber tubing to be conveniently inserted therein and firmly engaged when the two sections are coupled together.

The above description is included to illustrate the operation of the preferred embodiment and is not meant to limit the scope of the invention. The scope of the invention is to be limited only by the following claims. From the foregoing description, many variations may be apparent to those skilled in the art that would yet be encompassed by the spirit and scope of the invention.

What is claimed is:

1. A temporary repair apparatus for securing gas leaking from ends of a container comprising:
    plate means having a diameter generally smaller than the constricted end diameter of said container walls;
    tube means coupled to the outer edge of said plate means, said tube means capable of being inflated, said tube means for preventing chemicals from escaping in a surround environment when said tube is inflated; and
    mount means coupled to said plate means for securing said plate means against said constricted container walls.

2. The apparatus of claim 1 further including a capsule of compressed gas coupled to said tubing means for inflating said tube when said plate means is positioned within said container constricted walls.

3. A device of claim 1 wherein said plate means consists of two generally identical pieces, said plate means for engaging said tubing means when said two plate sections are coupled together.

4. The apparatus of claim 1 wherein said mounting means includes a handle and a plurality of locking mechanisms, wherein said handle positions said locking mechanisms.

5. The apparatus of claim 1 wherein said container is a ton container.

6. The apparatus of claim 1 further including a valve means for controlled release of chemicals escaped from said container.

7. The method of temporary containment of chemicals escaping from an end member of a container, wherein said container has constricted walls surrounding said end members, the method comprising the steps of:
    inserting repair apparatus past said constricted walls into a vicinity of said end member;
    coupling said repair apparatus to said constricted walls; and
    inflating a flexible member of said repair apparatus, wherein said inflating step causes said repair apparatus to have a greater diameter than said constricted walls.

8. The method of temporary containment of escaping chemicals of claim 7 further including the step of coupling said flexible member to an edge of a generally circular member, wherein inflating said flexible member increases a diameter of said repair apparatus.

9. The method of temporary containment of escaping chemicals of claim 8 wherein the step of coupling said repair apparatus to said constricted walls is accomplished by means of a locking mechanism.

10. The method of temporary containment of escaping chemicals of claim 9 further including the step of inflating said flexible member by means of gas compressed in a cylinder.

11. The method of temporary containment of escaping chemicals of claim 10 further including the step of engaging said flexible member between two plate members, said flexible member generally having the configuration of a tube.

12. The method of temporary containment of escaping chemicals of claim 11 further including the step of releasing chemicals trapped between said repair apparatus and said end member is released at a preselected location.

13. Apparatus for temporary repair of a container having a chemical escaping from an end member, wherein said container has a cylindrical wall extending beyond said end member with a diameter smaller than said end member, comprising:

a plate having an edge with a diameter smaller than any diameter of said extended cylinder wall;

a locking mechanism coupling to said plate for coupling said plate to an interior of said cylinder walls; and a tube coupled to said plate edge, said plate and tube having a diameter smaller than said any cylinder wall diameter when said tube is not inflated, said plate tube having a diameter greater than any cylinder wall diameter when said tube is inflated.

14. Apparatus for temporary repair of a container of claim 13 further including means for storing a compressed gas, said gas inflating said tube.

15. Apparatus for temporary repair of a container of claim 13 further includes a valve coupled to said plate for controllably releasing chemicals trapped by said temporary repair apparatus.

16. Apparatus for temporary repair of a container of claim 15 wherein said container is a ton container.

17. Apparatus for temporary repair of a container of claim 14 wherein said storing means includes a valve indicating a presence of compressed gas.

* * * * *